US011269803B1

(12) United States Patent
Chou et al.

(10) Patent No.: US 11,269,803 B1
(45) Date of Patent: Mar. 8, 2022

(54) METHOD AND SYSTEM FOR PROCESSOR INTERPOSER TO EXPANSION DEVICES

(71) Applicant: Quanta Computer Inc., Taoyuan (TW)

(72) Inventors: Le-Sheng Chou, Taoyuan (TW); Sz-Chin Shih, Taoyuan (TW); Shuen-Hung Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/108,733

(22) Filed: Dec. 1, 2020

(51) Int. Cl.
*G06F 13/36* (2006.01)
*G06F 13/42* (2006.01)
*G06F 13/40* (2006.01)

(52) U.S. Cl.
CPC ........ *G06F 13/4221* (2013.01); *G06F 13/409* (2013.01); *G06F 13/4045* (2013.01); *G06F 13/4068* (2013.01); *G06F 2213/0026* (2013.01)

(58) Field of Classification Search
CPC .. G06F 13/00; G06F 13/4221; G06F 13/4045; G06F 13/4068; G06F 13/409; G06F 2213/0026
See application file for complete search history.

(56) References Cited

U.S. PATENT DOCUMENTS

| | | | | |
|---|---|---|---|---|
| 6,366,467 B1* | 4/2002 | Patel | ...................... | H05K 1/141 257/691 |
| 2002/0049875 A1* | 4/2002 | Giora | ...................... | H04L 29/06 710/301 |
| 2002/0089833 A1* | 7/2002 | Patel | ...................... | H05K 1/141 361/760 |
| 2004/0054822 A1* | 3/2004 | Biran | ...................... | G06F 13/24 710/15 |
| 2014/0177625 A1* | 6/2014 | Chang | ................. | H01L 23/5381 370/351 |
| 2015/0134868 A1* | 5/2015 | Shaeffer | ................ | G06F 13/126 710/300 |
| 2016/0179647 A1* | 6/2016 | Das Sharma | ......... | H03M 13/09 714/736 |
| 2016/0182257 A1* | 6/2016 | Froelich | .............. | H04L 25/0262 375/229 |
| 2016/0191313 A1* | 6/2016 | Chen | ................... | H04L 41/0816 370/315 |
| 2016/0335222 A1* | 11/2016 | Schnell | ............... | G06F 13/4286 |
| 2018/0165244 A1* | 6/2018 | Jimenez | .............. | G06F 13/4022 |
| 2018/0225235 A1* | 8/2018 | Lee | ..................... | G06F 11/1048 |
| 2018/0240032 A1* | 8/2018 | van Rooyen | ........ | G06K 9/6297 |
| 2018/0253398 A1* | 9/2018 | Wu | .......................... | G06F 15/16 |
| 2019/0042518 A1* | 2/2019 | Marolia | .............. | G06F 9/45558 |
| 2019/0205279 A1* | 7/2019 | Tu | ....................... | G06F 13/4221 |
| 2020/0133907 A1* | 4/2020 | Stuewe | ............... | G06F 13/4282 |
| 2020/0186414 A1* | 6/2020 | Das Sharma | ....... | H04L 43/0888 |

\* cited by examiner

*Primary Examiner* — Henry Tsai
*Assistant Examiner* — Kim T Huynh
(74) *Attorney, Agent, or Firm* — Nixon Peabody LLP (57) ABSTRACT

A system and method for providing efficient communication between a processor and a device. An interposer is provided to send signals from the processor to the device. The interposer includes a printed circuit board, a first interconnection port communicating with the processor, and a second interconnection port communicating with the device. A retimer/redriver circuit is coupled to the first interconnection port and the second interconnection port, and the retimer/redriver circuit routes signals from the first interconnection port to the second interconnection port.

18 Claims, 7 Drawing Sheets

METHOD AND SYSTEM FOR PROCESSOR INTERPOSER TO EXPANSION DEVICES

TECHNICAL FIELD

The present disclosure relates generally to high speed signals in computing systems. More particularly, aspects of this disclosure relate to an interposer that may facilitate data communication between processors and expansion devices.

BACKGROUND

Computing servers increasingly are centered around processors such as CPUs or specialized processors such as graphic processing unit (GPUs). Multiple processors require fast communication between each other when programming operations are split between the processors. Such processors may also communicate with additional devices on expansion cards through a high speed bus.

The peripheral component interconnect express (PCIe) standard has been adopted for connection of high-speed components in computing devices. Devices have PCIe input/output (TO) units with multiple lanes to communicate data. Such IO units may include 4, 8, or 16 lanes that may be split into separate communication channels for connection to different PCIe devices. A bifurcation control mechanism from a basic input output system (BIOS) allows bifurcating a bus IO unit, such as a PCI Express bus IO unit into smaller buses, for different PCIe devices.

According to the PCIe specification, bifurcation provides flexibility for devices with PCIe IO units to match the lane width of connectors for communicating with the components of the system they are installed on. A wider lane width requires more actual hardware connection pins but provides higher communication speed. In a computer system with PCIe device support capability, PCIe root ports are usually provided by the CPU or chipset for connection to PCIe devices.

A wider width (e.g., one ×16 width port) provides higher communication speed with a PCIe device but reduces the total number of supported PCIe devices of the system. In contrast, a narrower width (e.g., four ×4 width ports) provides lower speed but more ports for PCIe devices to be connected. Such flexibility in the number of lanes per port provides a computer system designer the ability to provide different systems supporting different numbers and types of PCIe devices with the same CPU/chipset.

CPU and GPU technology changes rapidly as more and more features and higher density circuits are being introduced. Computer mother board designs thus need to be flexible to support different configurations of processors and expansion cards. For example, a mother board may be required to support one or two CPUs, and multiple PCIe devices in combination. The flexibility of such designs allows an optimal choice of components for maximizing cost/performance impact. One limitation of existing processors is their limited option for data bus types that are used to communicate with other processors and devices on the mother board. Typically, a processor can only support one type of bus configuration, and thus the expansion devices are limited to devices that are compatible with the bus configuration of the processor.

Figure 1:
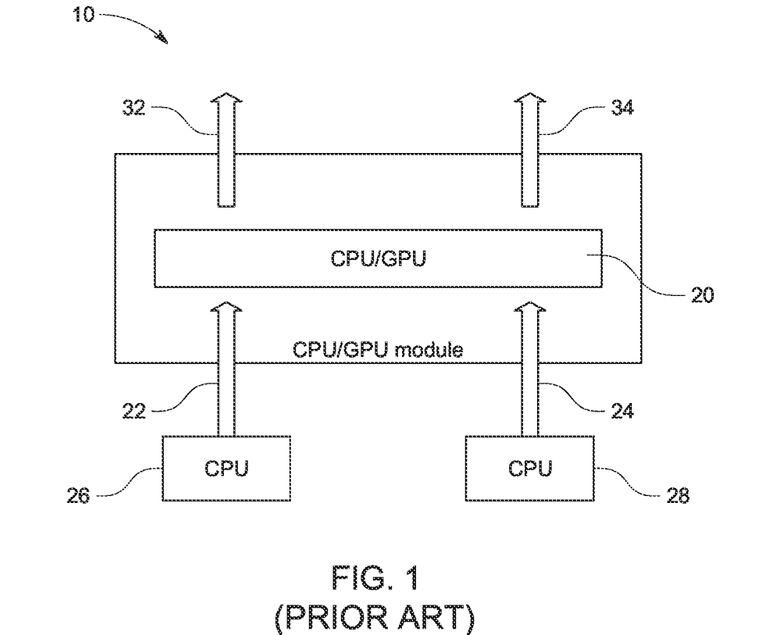
FIG. 1 is a block diagram of a prior art processor design showing connections between a processor and expansion devices.

FIG. 1 shows a typical known multi-processor system 10 with limited options for data communication. The system 10 includes a processor 20 which may be a CPU or GPU. In this example, the processor 20 may be connected to high speed interconnects 22 and 24 to receive data from other devices. Each of the high speed interconnects 22 and 24 may provide data communication from other devices such as other CPUs or GPUs such as the CPUs 26 and 28. In this example, the high speed interconnects 22 and 24 are PCIe or (Compute Express Link) CXL type interconnects 22 and 24. The processor 20 transmits signals from the interconnects 22 and 24 to high speed buses 32 and 34. The high speed busses 32 and 34 may be directly coupled to devices such as PCIe devices or to expansion slots, that may in turn be connected to expansion cards or other devices.

The system design in a server system is usually complicated. A CPU/chipset may have many groups of PCIe lanes, and each group can have an individual bifurcation setting. It is a challenge to identify different systems that require different bifurcation configurations. For example, two systems may have the same motherboard with different PCIe riser cards. Riser cards are an extension board which can be installed on the motherboard to route PCIe signals from motherboard to the PCIe cards installed on the riser card. Thus, different PCIe riser cards may need different PCIe bifurcation configurations. For example, a first riser card may route all 16 PCIe lanes to a single x16 width PCIe slot while a second riser card may route the 16 PCIe lanes to two x8 width PCIe slots. To complicate things further, a third system may have a totally different motherboard.

The use of the processor 10 as an intermediate device between other processors and devices causes delays. Further, the signals on the interconnects 22 and 24 may not be efficiently transmitted to the high speed busses 32 and 34 because of the translation operations between high speed protocols required to be performed by the processor 10 to transfer such signals.

Thus, there is a need for a CPU/GPU interposer to provide different bus bifurcation configurations between a processor and expansion devices. There is also a need for a processor interposer with a retimer/redriver circuit to move data from one high speed communication protocol to a different high speed protocol. There is a need for an interposer between a processor and PCIe end devices, to support such PCIe end devices to configure different bus bifurcation.

SUMMARY

One disclosed example is a system for communicating high speed data. The system has a processor and a first high speed connection coupled to the processor. The system has a second high speed connection and a device coupled to the second high speed connection. An interposer is coupled to the first high speed connection and the second high speed connection. The interposer includes a retimer/redriver circuit that transmits signals received from the processor via the first high speed connection to the device via the second high speed connection.

In another implementation of the disclosed example system, a first communication protocol of the first high speed connection is one of a CXL or PCIe protocol. In another implementation, a second communication protocol of the second high speed connection is different from the first communication protocol. In another implementation, the interposer modulates signals of the first communication protocol to the second communication protocol. In another implementation, the PCIe device is selected from the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch. In another implementation, the system includes a dual socket processor main board. The processor is connected to a first socket, and the interposer is connected to a second socket. In another implementation, the processor is one of a CPU or a GPU. In another implementation, the system includes a riser card having expansion card slots. The riser card is coupled to the second high speed interconnection. In another implementation, the first and second interconnections are coupled to PCIe busses. The interposer is bifurcates PCIe channels of the second interconnection. In another implementation, the system includes another processor board having another processor. The processor is interconnected with the another processor.

Another disclosed example is an interposer providing communication between a processor and a device. The interposer has a printed circuit board and a first interconnection port on the printed circuit board communicating with the processor. The interposer has a second interconnection port on the printed circuit board communicating with the device. A retimer/redriver circuit is coupled to the first interconnection port and the second interconnection port. The retimer/redriver circuit routes signals from the first interconnection port to the second interconnection port.

In another implementation of the disclosed example interposer, a first communication protocol of the first high speed connection is one of a CXL or PCIe protocol. In another implementation a second communication protocol of the second high speed connection is different from the first communication protocol. In another implementation, the interposer modulates signals of the first communication protocol to the second communication protocol. In another implementation, the device is one of the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch. In another implementation, the printed circuit board is connectable to a first socket of a multi-processor circuit board. The processor is connected to a second socket of the multi-processor circuit board. In another implementation the processor is one of a CPU or a GPU. In another implementation. a riser card having expansion card slots is coupled to the second high speed interconnection. In another implementation the first and second interconnections are coupled to PCIe busses. The interposer bifurcates the PCIe channels of the second interconnection.

Another disclosed example is a method of providing high speed data communications between a processor and a device. The method includes connecting an input port of an interposer having a retimer/redriver circuit to the processor. An output port of the interposer is connected to the device. The processor and device are booted. The interposer is configured to transmit signals received from the processor via the input port to the device via the output port.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure provides a CPU/GPU interposer circuit board with a high speed retimer/redriver circuit to support different high speed signal connection types. The interposer board may be plugged into a processor socket for use in multi-processor systems. The interposer circuit thus provides an interposer with a retimer/redriver circuit between processors and end devices that saves costs by replacing costly processors that currently perform the retiming and redriving functions. The example interposer supports PCIe end devices with less power consumption than using a processor. The example interposer may configure different bus bifurcations for a multi-lane bus such as a PCIe bus based on configurations provided by the BIOS. Thus the BIOS may configure the example interposer to support different high speed busses (e.g. CXL or PCIe) and bifurcation modes (e.g. x16, x8/x8, or x4/x4/x4/x4).

Figure 2:
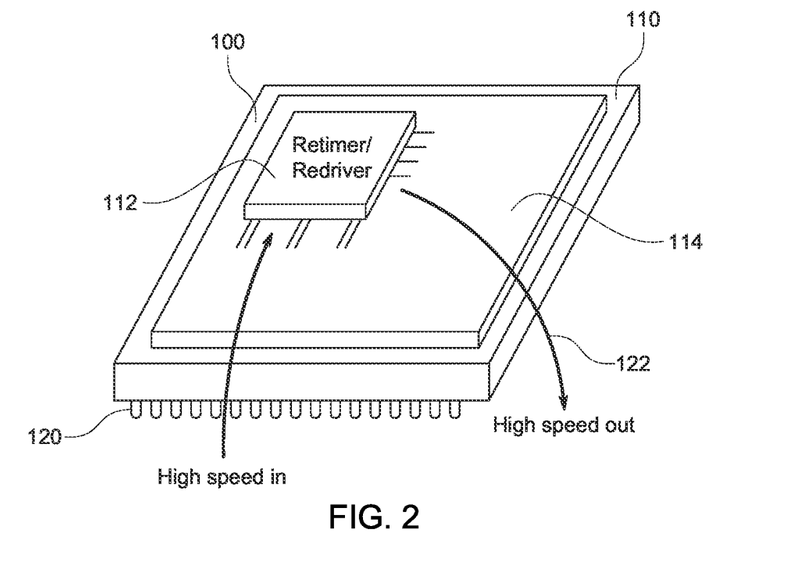
FIG. 2 is a diagram of an example interposer that allows communication between a processor and expansion devices.

FIG. 2 is an example interposer 100 that allows the transmission from a first type of high speed interconnection, such as a (Compute Express Link) CXL interconnection, to a second, different type of high speed connector, such as a high speed bus (e.g., a PCIe bus). The interposer 100 has a footprint that allows it to be installed in a standard CPU or GPU socket 110. The interposer 100 includes a circuit board 114 that includes a retimer/redriver chip 112. In this example, the chip 112 includes either a retimer or a redriver. The chip 112 may include a redriver if the input signals are sufficiently robust to require only amplification of the signal. Alternatively, the chip 112 may include a more complex retimer if a retransmission of a fresh signal is required for the passing of the signal. The circuit board 114 may include support circuits for the retimer/redriver chip 112, such as a voltage regulator controller and various passive resistors and capacitors. The retimer/redriver chip 112 modulates signals from one high speed protocol to another high speed protocol. The retimer/redriver chip 112 may include a strap pin that may be configured by the BIOS for high speed bus bifurcation. Alternatively, the pin may be configured by an on board jumper setting. Thus the circuit board 114 includes a high speed input interconnect port 120 and high speed output interconnect port 122. In this example, the high speed input interconnect 120 port may be connected to a CXL connection from a processor such as a CPU or GPU. The high speed output interconnect port 122 may be connected to a high speed PCIe bus. The PCIe bus may provide signals from the interposer 100 to PCIe devices.

Figure 3:
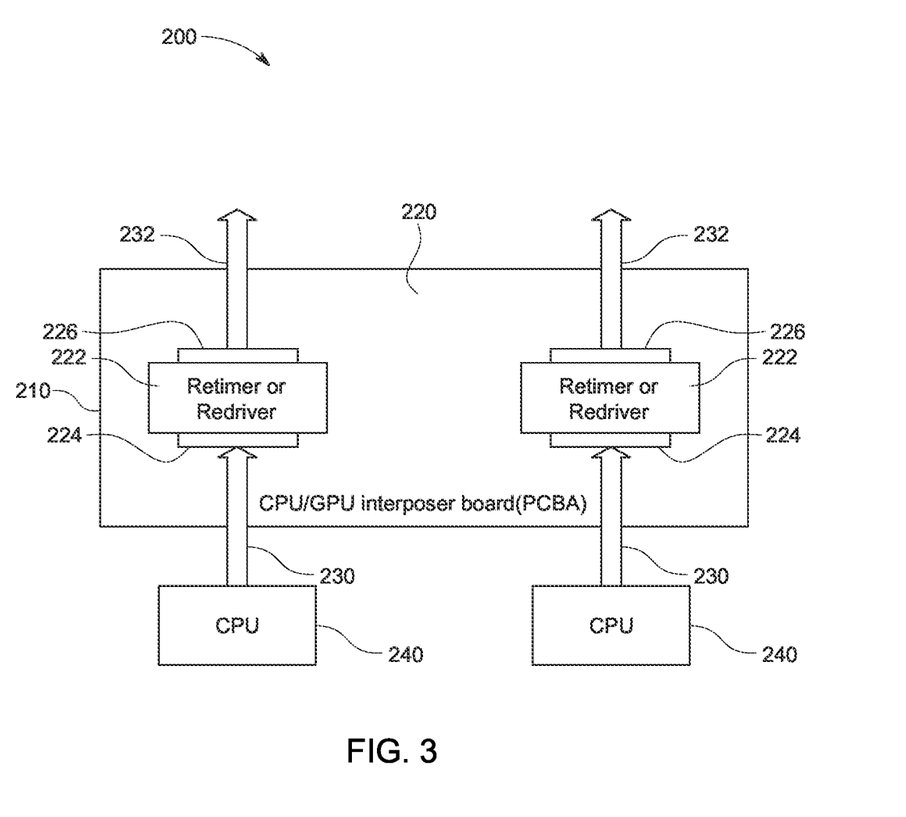
FIG. 3 is a block diagram of the use of the example interposer in FIG. 2 for communicating different communication protocols between a processor and a device.

FIG. 3 is a block diagram of an example system 200 that employs an example interposer 210. In this example, the interposer 210 has a circuit board 220 with two retimer/redriver chips 222. Each of the retimer/redriver chips 222 has a high speed input connector port 224 and a high speed output connector port 226. In this example, the high speed input connector ports 224 are connected to a high speed interconnect 230, such as a CXL interconnection that is coupled to a CPU 240. The high speed output connector port 226 is coupled to a high speed bus 232 such as a PCIe bus. The high speed bus 232 transmits the output signals to either an end PCIe device or an expansion slot that allows PCIe devices or cards to be connected in this example.

Figure 4:
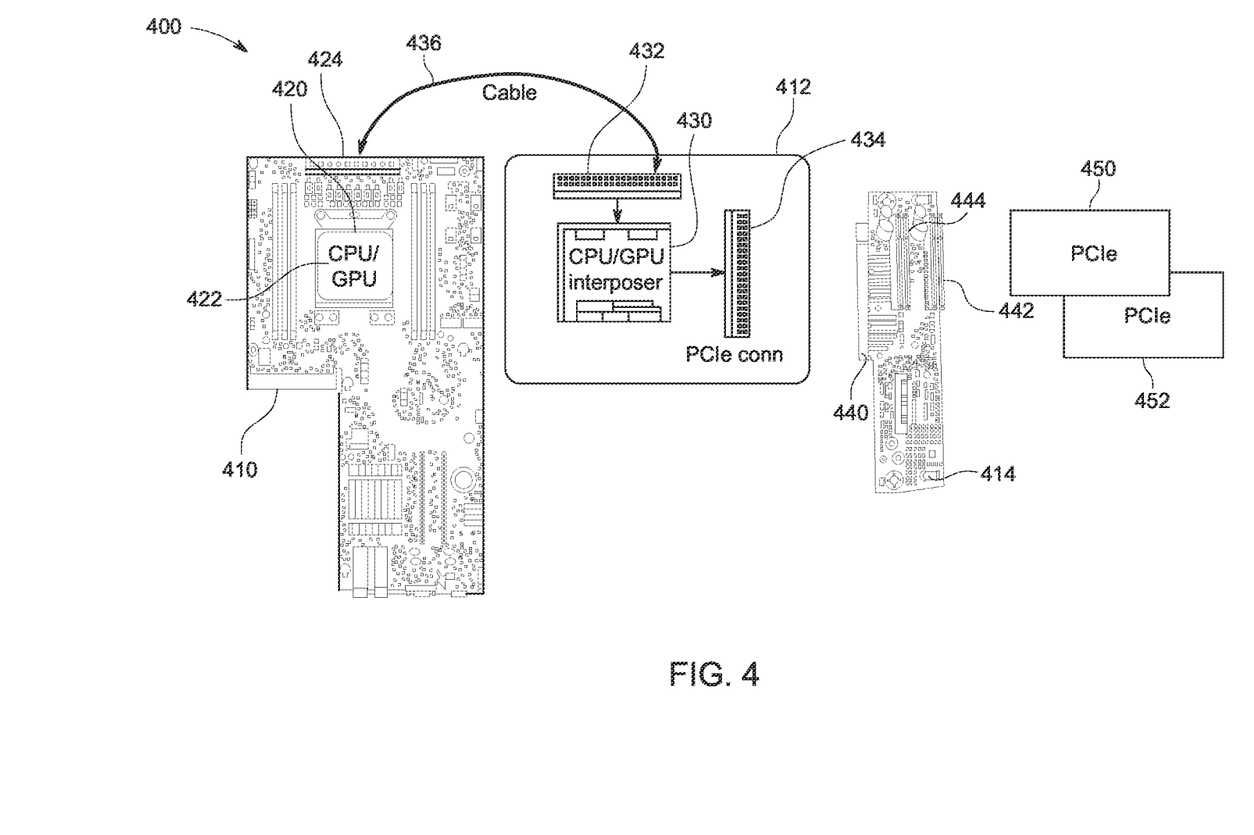
FIG. 4 is a block diagram of an example single processor system using the interposer in FIG. 2 to provide high speed signals to expansion cards.

FIG. 4 is a block diagram of an example single processor system 400. The system 400 includes a processor board 410, an interposer carrier board 412, and a riser card 414. The processor board 410 has a processor socket 420 that holds a processor 422 that may be a CPU or GPU. The processor 422 has a high speed port 424 that provides high speed interconnections to other processors. In this example, the high speed port 424 is a CXL interconnection port, but other types of high speed protocols may be used for the interconnection.

The interposer carrier board 412 includes a retimer/redriver chip 430 that is coupled to a high speed input port 432, and coupled to a high speed output port 434. In this example, the high speed input port 432 may accept signals from a high speed processor interconnection such as a CXL interconnection. In this example, the high speed output port 434 may be connected to a high speed bus such as a PCIe bus. In this example, a cable 436 connects the high speed interconnection port 424 of the processor board 410 to the high speed input connector port 432. In this example, the high speed output port 434 is a PCIe expansion slot.

The riser card 414 includes an edge connector 440 that may be plugged into the expansion slot of the interposer carrier board 412. The riser card 414 includes two PCIe connector sockets 442 and 444. Expansion cards or devices 450 and 452 may be inserted in the sockets 442 and 444. In this example, the output port 434 is a 16-lane PCIe channel, and the two sockets 442 and 444 on the riser card 414 are 8-lane PCIe sockets. The retimer/redriver chip 430 thus bifurcates the output port 434 into two 8-lane PCIe channels. Thus, the devices 450 and 452 each have an 8-lane PCIe port.

In this example, the interposer carrier board 412 may be set up to allow the processor 422 on the single board 410 to support an additional PCIe connector. The interposer carrier board 412 allows the processor to communicate with the PCIe devices 450 and 452 without having an additional PCIe connector. First, the high speed interconnection port 424 (CXL) to the processor 422 is set up. The cable 436 is connected to the input port 432 of the interposer carrier board 412 and the high speed connector port 424 of the processor board 410. The riser card 414 is then installed in the expansion slot to support the one or two PCIe cards 450 and 452 that may be attached to the riser card 414.

In this example, the PCIe cards that may be attached to the riser card 414 may be any PCIe compatible device. For example, such devices or cards may include a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch.

Figure 5:
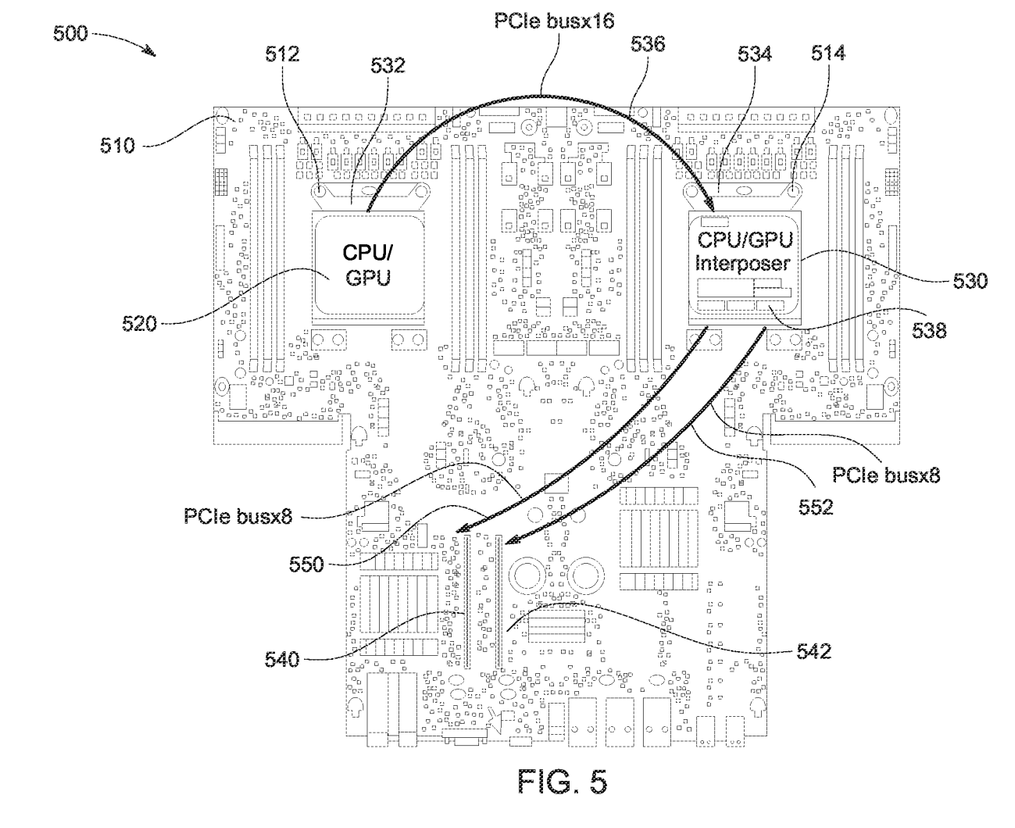
FIG. 5 is an example board arrangement of the example interposer on a dual processor motherboard.

FIG. 5 is a block diagram of a single processor system 500 using a dual processor mother board 510. The dual processor mother board 510 includes two processor sockets 512 and 514. One of the processor sockets holds a processor 520. The processor 520 may be a CPU or a GPU in this example. The second socket 514 holds an interposer chip 530. Both of the processor sockets 512 and 514 include a respective high speed connector ports 532 and 534. In this example, the high speed connector ports 532 and 534 are a 16-lane PCIe connector. A high speed cable 536 connects the high speed connector ports 532 and 534 to each other.

The dual processor board 510 also includes two PCIe expansion slots 540 and 542. The expansion slot 540 is connected to an 8-lane PCIe bus 550 in this example. The other expansion slot 542 is connected to another 8-lane PCIe bus 552. The interposer 530 has a high speed output connector port 538 that is connected to the PCIe busses 550 and 552. In this example, the high speed output connector port 538 is a 16-lane PCIe connector that is bifurcated into two 8-lane PCIe channels by the interposer 530.

The interposer 530 thus receives high speed signals from the processor 520 via the input connector 534 through a 16-lane PCIe channel. The interposer 530 bifurcates the 16-lane PCIe bus signals from the input connector 534 to the two 8-lane PCIe busses 550 and 552. Thus, the interposer 530 outputs the signals received from the processor 520 on one of the two high speed PCIe busses 550 or 552. The signals are received by devices connected to the expansion slots 540 or 542. The advantage of using the two socket motherboard with the interposer 530 is that for a specific workload that requires less processor performance but more support for end devices, this configuration allows for greater support for such end devices via the interposer 530.

The configuration of the system 500 includes first installing the processor 520 in the socket 512. The processor 520 is designated as the master CPU. The interposer 530 is then installed in the socket 514, which is the slave CPU socket. In this example, the interposer 530 is configured during system boot up by the BIOS to redirect signals from the processor 520 to the high speed busses 550 and 552 to expansion devices connected to the expansion slots 540 and 542.

Figure 6:
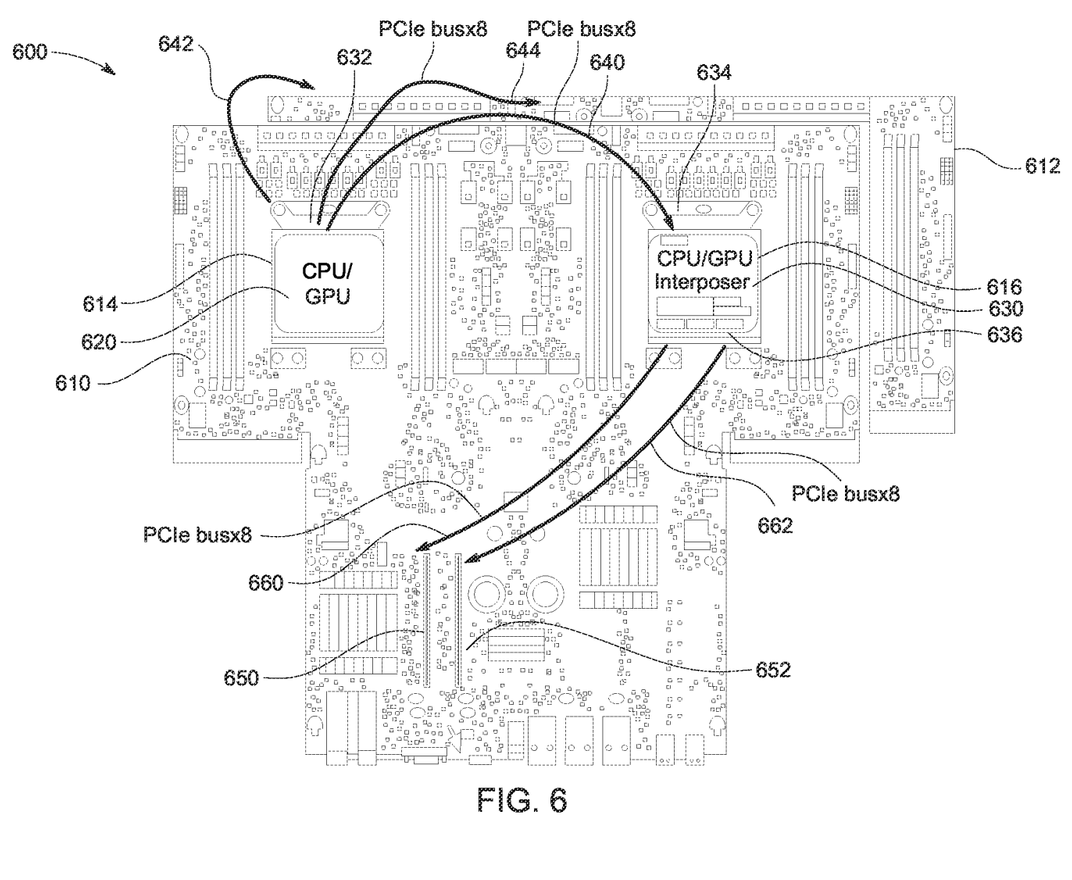
FIG. 6 is a block diagram of a quad processor system using the example interposer.

FIG. 6 is a block diagram of a quad processor system 600 using an example interposer to facilitate data communication. The system 600 includes two dual processor boards 610 and 612. The dual processor board 610 includes two processor sockets 614 and 616. One of the processor sockets 614 holds a processor 620. The processor 620 may be a CPU or a GPU in this example. The second socket 616 holds an interposer chip 630. Both of the processor sockets 614 and 616 include a high speed connector 632 and 634 respectively. In this example the high speed connectors 632 and 634 are both 24-channel PCIe connectors. A high speed cable 640 connects the high speed connectors 632 and 634 to each other as an 8-lane PCIe bus.

The other dual processor board 612 has two processor sockets with corresponding interposers (not shown). A first high speed cable 642 connects a high speed connector of one of the processor sockets of the dual processor board 612 with the high speed connector 632. In this example, the high speed connector 632 is bifurcated into two 8-channel PCIe interconnections. Thus, the first high speed cable 642 is an 8-lane PCIe bus that is connected to one of the interposers in one of the sockets of the dual processor board 612. A second high speed cable 644 is connected to the interposer on the other processor socket of the dual processor board 612. In this example, the second high speed cable 644 is an 8-lane PCIe bus that is connected to the other interposer on the dual processor board 612.

The dual processor board 610 also includes an expansion slot area that supports two PCIe expansion slots 650 and 652 in this example. The expansion slot 650 is connected to an 8-lane PCIe bus 660 in this example. The other expansion slot 652 is connected to another 8-lane PCIe bus 662. In this example, the PCIe busses 660 and 662 are traces on the circuit board 610 that route signals between the processor 620 and the expansion slots 650 and 652. The interposer 630 has a high speed output connector 636 that accesses the PCIe busses 650 and 652. In this example, the high speed output connector 636 is a 16 lane PCIe connector that is bifurcated into two separate 8 lane PCIe channels for the respective PCIe busses 650 and 652. The other dual processor board 612 has similar PCIe expansion slots that are connected to each of the processor sockets through respective PCIe busses.

The interposer 630 thus receives high speed signals from the processor 620 via the input connector 634 through an 8-lane PCIe channel. The processor 620 may receive data from other expansion devices connected to the expansion slots on the board 612 via either the cables 642 or 644. In this manner, the processor 620 may directly access additional expansion devices on the corresponding expansion slots on the dual processor board 612 through the interposers on that board. The interposer 630 directs the PCIe input bus signals and outputs the signals on one of the two high speed PCIe busses 660 or 662. The signals are thus received by devices connected to the expansion slots 650 or 652.

The configuration of the system 600 includes first installing the processor 620 in the socket 614. The processor 620 is designated as the first boot CPU. The interposer 630 is then installed in the socket 616, which is the slave CPU socket. The interposer 630 is thus configured to redirect signals from the processor 620 to the high speed busses 660 and 662 to expansion devices connected to the expansion slots 650 and 652.

Figure 7:
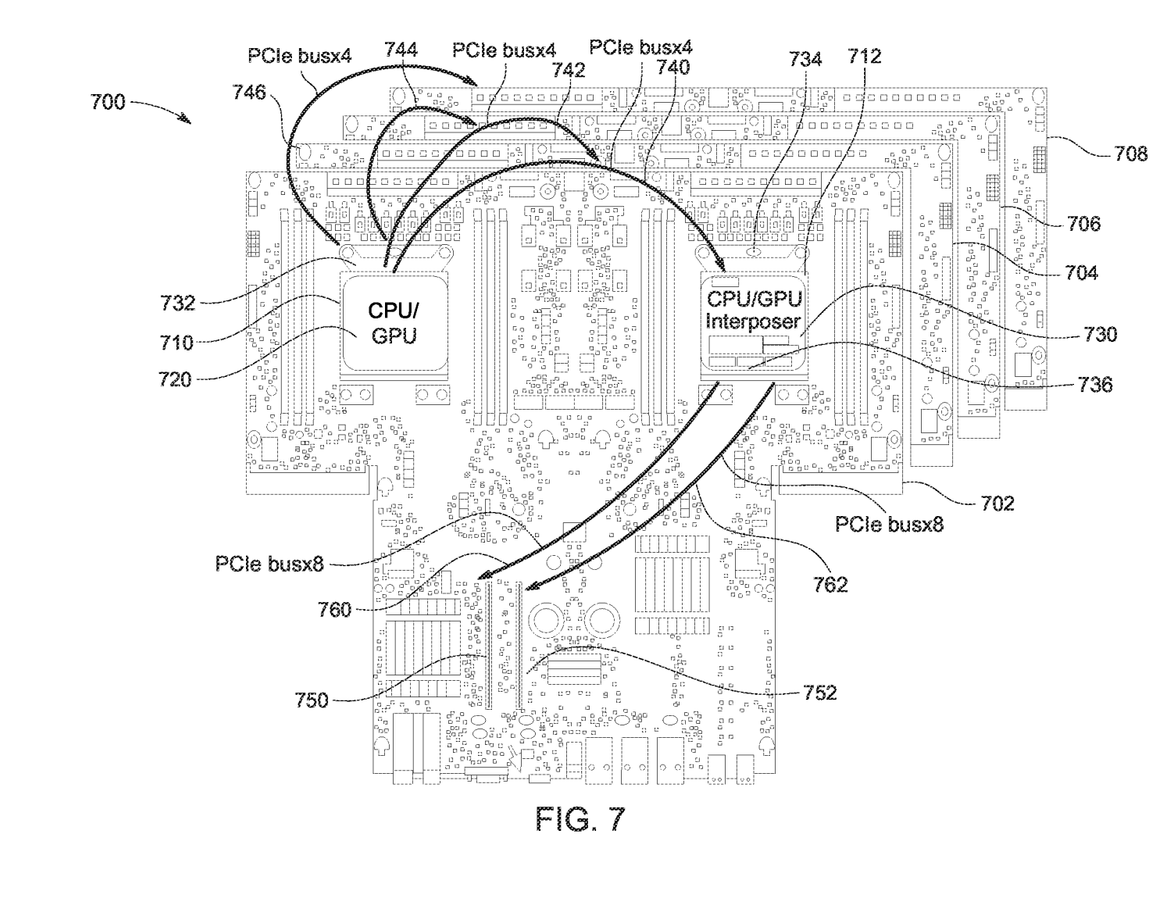
FIG. 7 is a block diagram of an eight processor system using the example interposer.

FIG. 7 is a block diagram of an eight processor system 700 using an interposer to facilitate high speed communication. The system 700 includes four dual processor circuit boards 702, 704, 706, and 708. The main dual processor circuit board 702 includes two processor sockets 710 and 712. One of the processor sockets 710 holds a processor 720. The processor 720 may be a CPU or a GPU in this example. The second socket 712 holds an interposer chip 730. Both of the processor sockets 710 and 712 include a high speed connector 732 and 734 respectively. In this example the high speed connectors 732 and 734 are a 16 channel PCIe connector. A high speed cable 740 connects the high speed connectors 732 and 734 to each other.

The other dual processor boards 704, 706, and 708 each have two processor sockets with a processor and an interposer attached (not shown). A first high speed cable 742 connects a high speed connector of one of the processor sockets of the dual processor board 704 with the high speed connector 732. In this example, the high speed connector 732 is bifurcated in four 4 channel PCIe interconnections. Thus, the first high speed cable 742 is a 4-lane PCIe bus that is connected to the interposer on the dual processor board 704. A second high speed cable 744 is connected to the interposer in one of the processor sockets of the dual processor board 706. In this example, the second high speed cable 744 is an 4-lane PCIe bus that is connected to the interposer on the dual processor board 706. A third high speed cable 746 is connected to the interposer in one of the processor sockets of the dual processor board 708. In this example, the third high speed cable 746 is a 4-lane PCIe bus that is connected to the interposer on the dual processor board 708.

The main dual processor circuit board 702 also includes an expansion slot area that supports two PCIe expansion slots 750 and 752 in this example. The expansion slot 750 is connected to an 8 lane PCIe bus 760 in this example. The other expansion slot 752 is connected to another 8 lane PCIe bus 762. The interposer 730 has a high speed output connector 736 that accesses the PCIe busses 750 and 752. In this example, the high speed output connector 736 is a 16-lane PCIe connector that is bifurcated into two separate 8-lane PCIe channels for the respective PCIe busses 760 and 762.

The interposer 730 thus receives high speed signals from the processor 720 via the input connector 734 through an 8 lane PCIe channel. The processor 720 may receive data from the other processors on the boards 704, 706, and 708 via the respective cables 742, 744, or 746. The interposer 730 directs the PCIe input bus signals and outputs the signals on one of the two high speed PCIe busses 760 or 762. The signals are thus received by devices connected to the expansion slots 750 or 752. In addition, the interposer 730 accepts high speed signals from the processors on the dual processor boards 704, 706, and 708 that are directed through the processor 720.

The configuration of the system 700 includes first installing the processor 720 in the socket 710. The processor 720 is designated as the first boot CPU. The interposer 730 is then installed in the socket 712, which is the slave CPU socket. The interposer 730 is thus configured to redirect signals from the processor 720 to the high speed busses 760 and 762 to expansion devices connected to the expansion slots 750 and 752.

Figure 8:
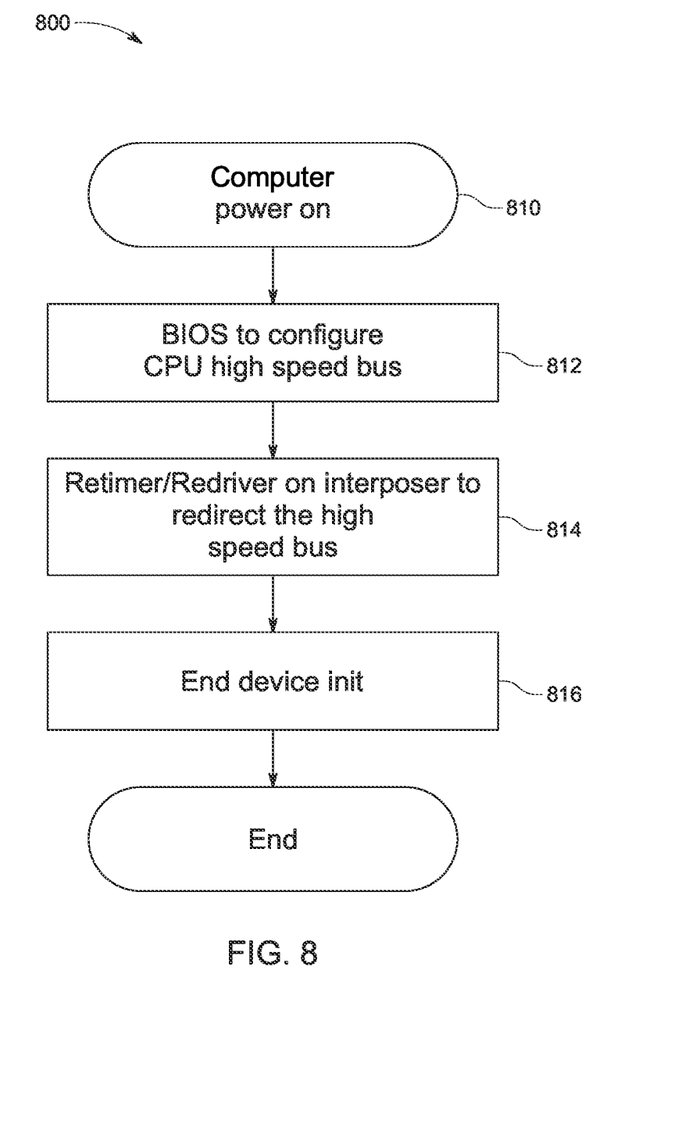
FIG. 8 is a flow diagram of a routine that initializes the example interposer.

The flow diagram in FIG. 8 is representative of example machine readable instructions for the process of initializing a processor and expansion device for communication through an example interposer. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC]; a programmable logic device [PLD]; a field programmable logic device [FPLD]; a field programmable gate array [FPGA]; discrete logic; etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

FIG. 8 is a flow diagram 800 of the process of initializing an interposer such as the interposer 530 in FIG. 5. The routine first detects that the system is powered on and begins the boot process of the processor 520 and the interposer 530 (810). During the boot process, the BIOS detects the interposer system configuration and initiates the high speed bus bifurcation (812). The configurations may include configuring the interposer 530 for a CXL or PCIe interface. The configuration may include a bifurcation such as a PCIe x16, x8/x8 or x4/x4/x4/x4. The configuration may also include different versions of PCIe such as PCIe Gen3/Gen4 or Gen 5. For example, in FIG. 5, the BIOS configures the bifurcation to split the output PCIe channel into two 8-lane PCIe channels for the two expansion slots 540 and 542. The routine then configures the retimer/redriver circuit on the interposer 530 to redirect signals received from processor 520 signal to end devices connected to the interposer 530 such as devices plugged into the expansion slots 540 and 542 (814). The end devices such as PCIe devices plugged into the expansion slots 540 and 542 are then initiated (816).

The interposer may have a set of pins that may mate with processor sockets. In configurations such as in FIGS. 5-7, an interposer allows a single processor to access multiple PCIe slots without having to employ a more expensive second processor. Thus, in applications that require only a single processor, the interposer saves resources by using an existing dual socket motherboard, to increase the available PCIe devices. The interposer performs the relative simple task of communication between high speed connections, and thus does not include the additional processing cores and supporting circuits of a general purpose processor. The interposer is cheaper to obtain when compared to a general purpose processor. Thus, costs associated with building a computing system, such as one with a dual socket motherboard, may be reduced. Further, since the interposer is dedicated to facilitating communication between high speed connections, delays that a processor may impose if it is used to facilitate communications with the other PCIe slots because it performs other computational tasks may be avoided by the interposer.

As used in this application, the terms "component," "module," "system," or the like generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for communicating high speed data, the system comprising:
 a first dual socket processor main board;
 a first processor socket on the first dual socket processor board;
 a second processor socket on the first dual socket processor board;
 a first processor in the first processor socket;

a first high speed connection coupled between the first processor socket and the second processor socket;

a second high speed connection coupled to the second processor socket;

a first device coupled to the second high speed connection;

a first interposer installed in the second processor socket, the first interposer coupled to the first high speed connection and the second high speed connection, the first interposer including a retimer/redriver circuit that transmits signals received from the first processor via the first high speed connection to the first device via the second high speed connection, wherein the first interposer directly and exclusively transmits signals from the first high speed connection to the second high speed connection to the first device without selectively switching the signals; and a second dual socket processor main board having a third processor socket, a fourth processor socket, a second device, and a second interposer installed in the third processor socket, wherein the second interposer is coupled to the first processor via a third high speed connection, and wherein the second device is coupled to the second interposer via a fourth high speed connection, wherein the second interposer directly transmits signals from the fourth high speed connection to the third high speed connection.

2. The system of claim 1, wherein a first communication protocol of the first high speed connection is one of a CXL or PCIe protocol.

3. The system of claim 1, wherein a second communication protocol of the second high speed connection is different from the first communication protocol.

4. The system of claim 3, wherein the first interposer modulates signals of the first communication protocol to the second communication protocol.

5. The system of claim 1, wherein the first device is selected from the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch.

6. The system of claim 1, wherein the first processor is one of a CPU or a GPU.

7. The system of claim 1, further comprising a riser card having a plurality of expansion card slots, the riser card coupled to the second high speed interconnection.

8. The system of claim 1, wherein the first and second interconnections are coupled to PCIe busses, and wherein the first interposer is operable to bifurcate PCIe channels of the second interconnection.

9. The system of claim 1, further comprising a second processor installed in the fourth processor socket, wherein the first processor is interconnected with the second processor.

10. A method of providing high speed data communications between a first processor and a first device on a first dual processor main board, and a second dual processor main board, wherein the first processor is installed in a first socket of the first dual processor main board, the method comprising:

connecting an input port of a first a # interposer in a second socket of the first dual processor main board, the first interposer having a retimer/redriver circuit, to the first processor;

connecting an output port of the first interposer to the first device, the first interposer operable to exclusively and directly transmit signals from the input port to the output port without selectively switching the signals;

coupling the first processor to an input port of a second interposer on a third socket of the second dual socket processor main board via a first high speed connection;

connecting an input port of the second interposer in a fourth socket of the second dual processor main board;

connecting an output port of the second interposer to a second device on the second dual socket processor main board via a second high speed connection, wherein the second interposer directly transmits signals from the second high speed connection to the first high speed connection;

booting the first processor and the first device; and configuring the first interposer to exclusively and directly transmit signals received from the first processor via the input port to the first device via the output port.

11. The method of claim 10, wherein a first communication protocol of a first high speed connection between the input port of the first interposer and the first processor is one of a CXL or PCIe protocol.

12. The method of claim 11, wherein a second communication protocol of a second high speed connection between the first interposer and the first device is different from the first communication protocol.

13. The method of claim 12, wherein the first interposer modulates signals of the first communication protocol to the second communication protocol.

14. The system of claim 12, wherein the first and second interconnections are coupled to PCIe busses, and wherein the first interposer is operable to bifurcate PCIe channels of the second interconnection.

15. The method of claim 11, wherein the first device is selected from the group consisting of a network interface card (NIC), a non-volatile memory express (NVMe) device, a redundant array of independent disks (RAID) card, a host bus adapter (HBA) card, a video card, a sound card, a graphics processing unit (GPU) card, a field programmable gate array (FPGA) card, and a PCIe switch.

16. The method of claim 11, wherein the first processor is one of a CPU or a GPU.

17. The method of claim 11, further comprising coupling a riser card having a plurality of expansion card slots to a second high speed interconnection between the first interposer and the first device.

18. The method of claim 11, further comprising:

installing a second processor is in the fourth processor socket; and interconnecting the first processor with the second processor.

* * * * *